US008089395B2

(12) United States Patent
Blake

(10) Patent No.: US 8,089,395 B2
(45) Date of Patent: Jan. 3, 2012

(54) PHASE CORRECTION IN A DEPLOYABLE ANTENNA SYSTEM

(75) Inventor: Trevor Martin Blake, Chelmsford (GB)

(73) Assignee: Bae Systems plc, London (GB)

( * ) Notice: Subject to any disclaimer, the term of this patent is extended or adjusted under 35 U.S.C. 154(b) by 0 days.

(21) Appl. No.: 11/887,895

(22) PCT Filed: Jul. 12, 2007

(86) PCT No.: PCT/GB2007/050398
§ 371 (c)(1), (2), (4) Date: Aug. 13, 2009

(87) PCT Pub. No.: WO2008/007144
PCT Pub. Date: Jan. 17, 2008

(65) Prior Publication Data

US 2009/0303127 A1 Dec. 10, 2009

(30) Foreign Application Priority Data

Jul. 14, 2006 (EP) .................................... 06253698
Jul. 14, 2006 (GB) .................................. 0614093.3

(51) Int. Cl.
*G01S 7/40* (2006.01)
*H01Q 3/34* (2006.01)

(52) U.S. Cl. ........................................ 342/174; 342/372

(58) Field of Classification Search ............. 342/357.62, 342/368, 372, 157, 174, 371, 408, 423, 424, 342/432, 433, 434, 437, 442, 445, 446; 343/853; 455/115.1, 115.2; *G01S 7/40; H01Q 3/00, H01Q 3/12, 3/30, 3/34*
See application file for complete search history.

(56) References Cited

U.S. PATENT DOCUMENTS 4,368,469 A * 1/1983 Ott et al. ........................ 342/352
5,623,270 A 4/1997 Kempkes et al.
5,896,105 A * 4/1999 Murphy et al. ............... 342/368
6,141,880 A 11/2000 Vircks et al.
6,618,002 B1 * 9/2003 Perry ............................ 342/107
6,844,849 B1 * 1/2005 Barrick et al. ................ 342/372
(Continued)

FOREIGN PATENT DOCUMENTS

GB 2302990 A * 2/1997
(Continued)

OTHER PUBLICATIONS

Article from the Internet (www.raytheon.com): High-Frequency Surface Wave Radar (HFSWR), Raytheon Company, published in 2004, two pages.*

(Continued)

*Primary Examiner* — Thomas Tarcza
*Assistant Examiner* — John Vigushin
(74) *Attorney, Agent, or Firm* — Kenyon & Kenyon LLP

(57) ABSTRACT

A method and corresponding apparatus are provided for phase correction in a deployable antenna system, in particular a redeployable HF surface wave radar phased array antenna system, the antenna system including a master control unit and a plurality of separate antenna elements which are relatively moveable to desired spaced-apart locations, wherein each antenna element is provided with RF signal processing means, the method including the steps of:
(i) determining the relative positions of the antenna elements and the master control unit;
(ii) transmitting a phase reference signal; and
(iii) determining, on receiving the phase reference signal and using the relative positions determined at step (i), phase correction signals for each of the plurality of antenna elements.

11 Claims, 3 Drawing Sheets

U.S. PATENT DOCUMENTS

| | | | | |
|---|---|---|---|---|
| 2002/0008672 | A1 * | 1/2002 | Gothard et al. ............... | 343/893 |
| 2005/0179579 | A1 * | 8/2005 | Pinder et al. ................ | 342/25 R |

FOREIGN PATENT DOCUMENTS

| | | |
|---|---|---|
| GB | 2357918 | 7/2001 |
| GB | 2382481 | 5/2003 |
| GB | 2412029 | 9/2005 |
| WO | WO 2004/042869 | 5/2004 |

OTHER PUBLICATIONS

Surface-Wave Radar and its Applications, Ronold W.P. King, IEEE Transactions on Antennas and Propagation, vol. 51, No. 10, Oct. 2003, pp. 3000-3002.*

International Search Report, Dec. 12, 2007, from International Patent Application No. PCT/GB2007/050398.

Blake, T.M., "Development of a rapidly re-deployable HF radar concept" Electromagnetic Remote Sensing (EMRS) Defense Technology Center (DTC), May 20, 2004.

European Patent Office, International Preliminary Report on Patentability and Written Opinion, Jan. 14, 2009, from International Patent Application No. PCT/GB2007/050398, filed on Jul. 12, 2007.

U.K. Patent Office, Search Report, Nov. 6, 2006, from related UK Patent Application No. GB 0614093.4, filed Jul. 14, 2006.

European Patent Office, Extended Search Report, Feb. 28, 2007, from related European Patent Application No. EP06270055.4, filed Jul. 14, 2006.

* cited by examiner

PHASE CORRECTION IN A DEPLOYABLE ANTENNA SYSTEM

RELATED APPLICATION INFORMATION

This application is a United States National Phase Patent Application of, and claims the benefit of, International Patent Application No. PCT/GB2007/050398 which was filed on Jul. 12, 2007, and which claims priority to British Patent Application No. 0614093.3, which was filed on Jul. 14, 2006 and European Patent Application No. 06253698.2, which was filed on Jul. 14, 2006, the disclosures of each of which are incorporated herein by reference.

FIELD OF THE INVENTION

The present invention relates to a deployable antenna system, in particular though not exclusively to phase correction in an HF radar phased array antenna system that is adapted for rapid deployment.

BACKGROUND INFORMATION

In "Deployment of a rapidly re-deployable HF radar concept", T. M. Blake, Electro-Magnetic Remote Sensing (EMRS) Defence Technology Centre (DTC) 1st Annual Technical Conference 20-21 May 2004, there is disclosed an HF surface wave radar system as shown in FIG. 1, comprising a linear array of separate spaced apart (7 meter spacing) receive antenna elements 2, each element being a vertical active antenna, 2.5 meters long. Each element includes a receiver 4 for processing received signals. The elements are connected in a daisy chain arrangement by digital data link cables 6 to a control centre 8, shown located in a van. A corresponding transmit antenna array 9 is also provided. The system is taken to a site in a disassembled state in the van, and then rapidly assembled by two technicians by placing the elements in the ground in spaced apart positions, and connecting them together by the data link cables.

By placing receivers at the base of the elements, difficulties arise in that the elements have to be synchronised in time, frequency and phase in order that the radar system function accurately. Further their position relative to one another needs to be known accurately, but since they are positioned by hand by technicians without scientific instruments to permit accurate placement, (desirably to within 0.1 meters) this is a further problem.

Whilst a wide variety of HF antenna arrays are known comprising a multiplicity of antenna elements, such elements are normally fixedly mounted together in a framework or other mounting arrangement—this would not be suitable for a rapidly deployable system, in particular where the elements are spaced a long distance apart.

SUMMARY OF THE INVENTION

From a first aspect, the present invention resides in a method for phase-correcting a deployable antenna system, the antenna system comprising a master control unit and a plurality of separate antenna elements which are relatively moveable to desired spaced-apart locations, wherein each antenna element is provided with RF signal processing means, the method comprising the steps of:

(i) determining the relative positions of the antenna elements and the master control unit;

(ii) transmitting a phase reference signal; and (iii) determining, on receiving the phase reference signal and using the relative positions determined at step (i), corrected phase signals for the antenna elements.

The method according to this first aspect of the present invention may be applied in a transmitting antenna array or a receiving antenna array. In the case of a receiving antenna array, at step (ii), the phase reference signal is transmitted by the master control unit and, at step (iii), the phase reference signal is received by each of the plurality of antenna elements.

In a preferred embodiment, the corrected phase signals are applied at the master control unit. That is, the phase of signals received by each antenna element is phase-corrected by the master control unit. However, phase corrections may be applied, alternatively, by each of the antenna elements. Similarly, in the case of a transmitting antenna array, the master control unit may apply respective phase corrections to signals before they are communicated to the transmitting antenna elements, or the phase corrections may be applied at the antenna elements prior to transmission.

Preferred embodiments of the present invention are particularly applicable to phase correction in a rapidly redeployable high frequency (HF) surface wave radar array. However, phase correction by the method according to the present invention may also be applied to other types of radio and phased array radar systems, including VHF, HF skywave, DF broadcasting systems and radio astronomy systems.

The step of determining the relative positions of the antenna elements and the master control unit may be achieved using any one of a number of different techniques. In one technique, fixed length cords or strings may be attached between adjacent spaced apart antenna elements so that when pulled tight, the elements have a predetermined spacing. The elements may then be aligned in a straight row by visual line of sight techniques, or possibly, a laser measuring device may be employed for alignment However, in general there is a requirement for very rapid deployment of the antenna array, particularly in radar applications, so that means of determining element position without any great skill being required on the part an operator is desirable. Preferably therefore, relative positions may be determined using radio location means, where the positions of the antenna elements are determined by an RF system. Whereas any one of a number of different radio location techniques may be applied in the present invention, it is preferred that each antenna element is provided with a receiver of a satellite radio navigation system, commonly known as GNSS (Global Navigation Satellite Systems), including GPS, GLONASS and Galileo. This may provide the required degree of accuracy of location, and does not require expensive equipment for radio location to be installed at the master control unit of the antenna system.

It is important that a phased array radar system should have accurate phase synchronisation of each antenna element, with all sources of phase error compensated for. There are two important sources of phase error: firstly that arising from inaccuracies of positioning of antenna elements; and secondly there are phase discrepancies arising in receivers/transmitters—principally phase error in local oscillators, but also phase changes occurring in RF elements such as amplifiers, filters, in the processing path of the RF signal.

In accordance with the present invention, phase errors arising from positioning of the antenna elements are avoided by knowledge of their relative location, for example through use of a satellite radio navigation system. As regards phase errors arising in receivers/transmitters, there are various ways of compensating for these. For example a pre-calibration procedure may be carried out on each receiver/transmitter, and as a result phase adjustments may be introduced. Alternatively a remote or telemetric procedure may be used. Thus where the precise cable lengths to each element are known, it is possible to determine the electrical path length to each element. Reference signals transmitted along the cables may be returned by each element, and inspected for variations from expected phase. Phase adjustments may then be applied.

Preferably, to avoid the need for exactly known cable lengths, means for phase correction employed in the present invention are arranged, in the case of a receive antenna array, to generate and to transmit a phase reference signal at a master control unit, which signal is detected by a receiver at each antenna element. The master control unit also generates an expected phase differential signal for each receiver, based upon knowledge of the antenna element position and this may be passed to the respective receiver. The receiver compares the actual received phase signal with the expected value in a phase comparator, and this generates a phase correction signal for aligning the phase of the receiver with those of the other receivers. The phase correction may be applied to each receiver, but as preferred for convenience the phase correction for all receivers takes place at the master control unit.

As an alternative, for a transmit antenna system comprising a plurality of separate antenna elements, each transmitter device may transmit a phase reference signal that is detected by a receiver mounted in a master unit, and appropriate phase correction may then take place.

As preferred, the antenna elements are connected together in a daisy chain arrangement by data link cables; alternatively, a point-to-point radio link may be provided.

From a second aspect, the present invention resides in a deployable phased array antenna system, comprising a master control unit and a plurality of separate antenna elements which are relatively movable to desired spaced apart positions, each antenna element having respective RF signal processing means, the system further comprising means for phase-correcting the antenna system, said means being operable:

(i) to determine the relative locations of the master control unit and the antenna elements; and (ii) to transmit a phase reference signal and, on receiving the phase reference signal at each antenna element and using the relative positions from step (i), to generate corrected phase signals for each antenna element.

From a third aspect, the present invention resides, in a deployable phased array receive antenna system comprising a plurality of separate antenna elements which are relatively movable to desired spaced apart positions, each antenna element including a respective receiver for receiving radio signals, and the system including a master control unit, a method of phase-correcting the antenna system comprising the steps:

(i) positioning said antenna elements and said master control unit, and determining their locations relative to one another;

(ii) radiating, from a transmitter in said master control unit, a phase reference signal which is detected by each said receiver; and (iii) comparing the phase of the phase reference signal received by each receiver with an expected value of the phase determined from knowledge of the locations of said master control unit and said antenna elements from step (i), and generating a corrected phase signal for each receiver.

From a fourth aspect, the present invention resides, in a deployable phased array transmit antenna system comprising a plurality of separate antenna elements which are relatively movable to desired spaced apart positions, each antenna element including a respective transmitter for transmitting radio signals, and the system including a master control unit, a method of phase-correcting the antenna system comprising the steps:

(i) positioning said antenna elements and said master control unit, and determining their locations relative to one another;

(ii) radiating a phase reference signal from each said transmitter which is detected by a receiver in said master control unit; and (iii) comparing the phase of each phase reference signal received by the receiver with an expected value of the phase determined from knowledge of the locations of said master control unit and said antenna elements from step (i), and generating a corrected phase signal for each said transmitter.

Thus phase correction may be achieved across either a receiving or a transmitting antenna array.

DETAILED DESCRIPTION

Figure 1:
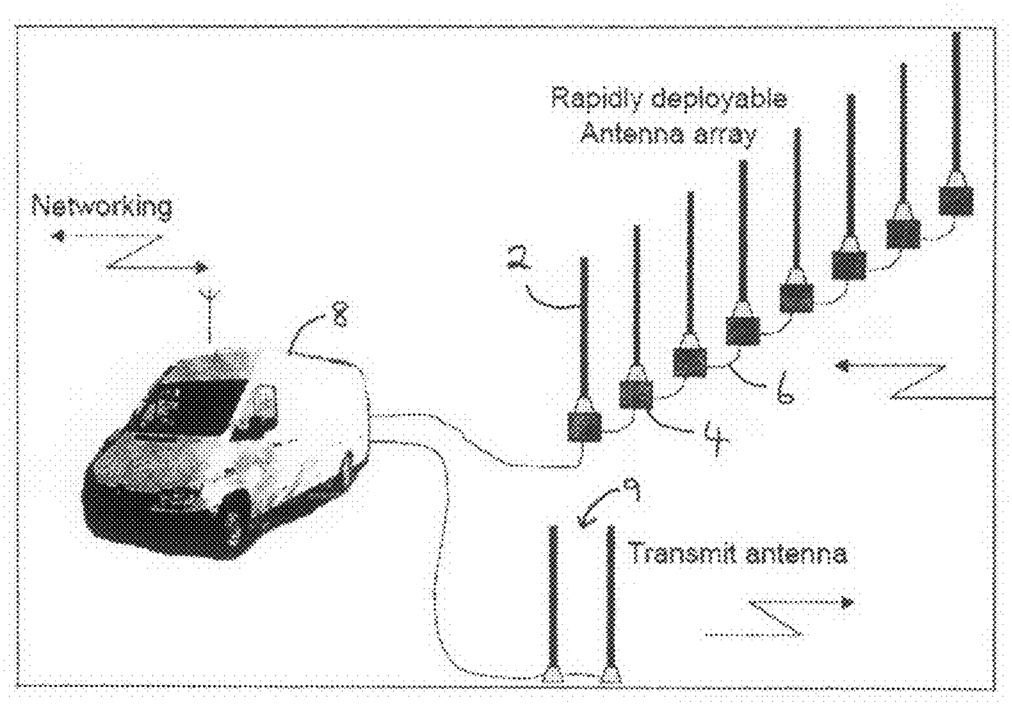
FIG. 1 is a schematic view of a known system of a rapidly re-deployable HF surface radar system.

Embodiments of the present invention will now be described in more detail, and by way of example only, with reference to the accompanying drawings.

The preferred embodiment of the invention may be applied as part of a distribution, reference, synchronisation and calibration scheme for a phased array receiving system of an HF radar system. The scheme simplifies installation of the phased array and enables rapid deployment and automatic synchronisation and calibration of the array. It has particular application to HF radar where phased array antennas are physically large, but also has application to general phased array implementations.

The design of a phased array antenna involves a decision on how the elements will be deployed, how the signals to or from the elements will be distributed, how the signals will be synchronised and how the array will be aligned or calibrated. Additionally an attractive proposition is to integrate the receiver or transmitter with each antenna element, which further complicates the distribution and synchronisation problem, by requiring many control and reference signals to be distributed. Many different schemes to address these issues exist, but all pose a significant problem when rapid deployment is required.

Problems that exist include the distribution of clean and phase coherent reference signals, the distribution of clean time synchronising signals, the deployment of multiple low loss cables, the accurate positioning of each antenna element, and the calibration of the array. The problem is how can the array be deployed rapidly and meet the distribution, synchronisation and calibration requirements. The preferred embodiment incorporates a synchronisation unit with each receiver/transmitter which may be used to eliminate the distribution, synchronisation and calibration problems above, but in particular to synchronise phase across the antenna.

The preferred embodiment simplifies the deployment of a phased array antenna by implementing a synchronisation, reference, calibration and distribution system that is incorporated with each antenna element. This synchronisation unit allows the antenna elements to be connected by a simple daisy chained digital data link eliminating the need for multiple cables, and making the array simple to deploy (alternatively, a point-to-point radio link may be employed). All operations relating to synchronisation, reference, distribution and calibration are implemented via the data link. This adds significant complexity but greatly simplifies deployment. The invention allows the array to be rapidly deployed without the need for careful physical alignment. The antenna elements can be deployed at irregular intervals, and interconnected with a simple daisy chain cable, or other data transmission media, and the invention will allow the array to be calibrated, and synchronised automatically. The preferred embodiment comprises the antenna elements that make up the phased array plus a master unit that is used to manage the operations.

Figure 2:
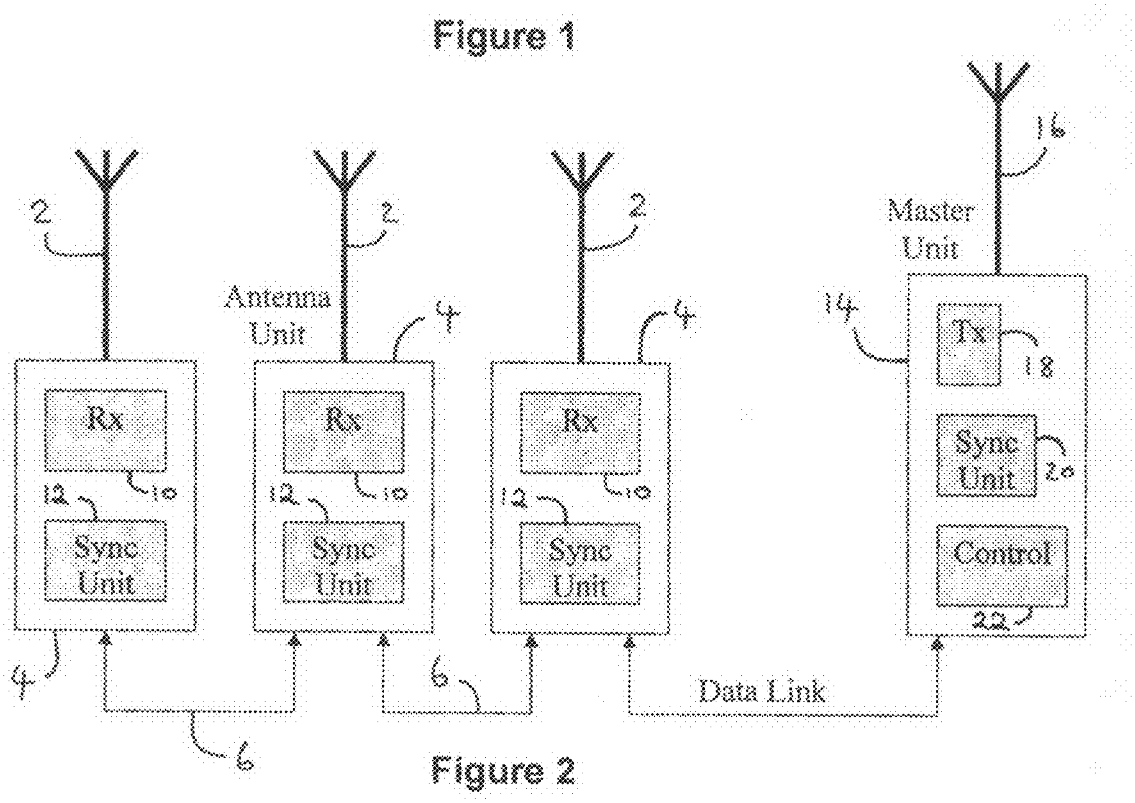
FIG. 2 is a schematic view of the preferred embodiment of the present invention.

Referring to FIG. 2, each antenna element 2, of a phased array receive antenna, has a receiver unit 4 including receiver circuitry 10 and a synchronisation unit 12. In addition active antenna circuitry is included, but not shown. The receiver units 4 are connected via data link cables 6 in a daisy chain arrangement to a master unit 14, which may conveniently located in a van. Master unit 14 includes an antenna 16 and a transmitter 18 for transmitting a low power phase reference signal to the antenna elements 2, as will be described. In addition a synchronisation unit 20 and a control unit 22 are provided.

In a modification for a transmitter antenna system, the receiver of each element would be replaced by a transmitter. In addition, the master unit would include a receiver for receiving phase synchronisation signals via the antenna 16.

The embodiment shown in FIG. 2 comprises building the receiver, and supporting local oscillator and timing generation, into each antenna element. Each unit thus contains its own means of generating timing and local oscillator signals, but each will be unsynchronised and what is required is a means of synchronising those signals and obtaining the position of the unit Each antenna unit hence incorporates a synchronisation unit (sync unit) 12. As will be described with reference to FIG. 4, the sync unit includes a satellite navigation receiver (GPS or other), a conditioned reference oscillator and local oscillator and timing generation. These units provide not only the position information, but also the infrastructure to achieve timing, frequency and phase synchronisation. The master unit incorporates a sync unit plus a control unit and a low power transmitter.

Figure 3:
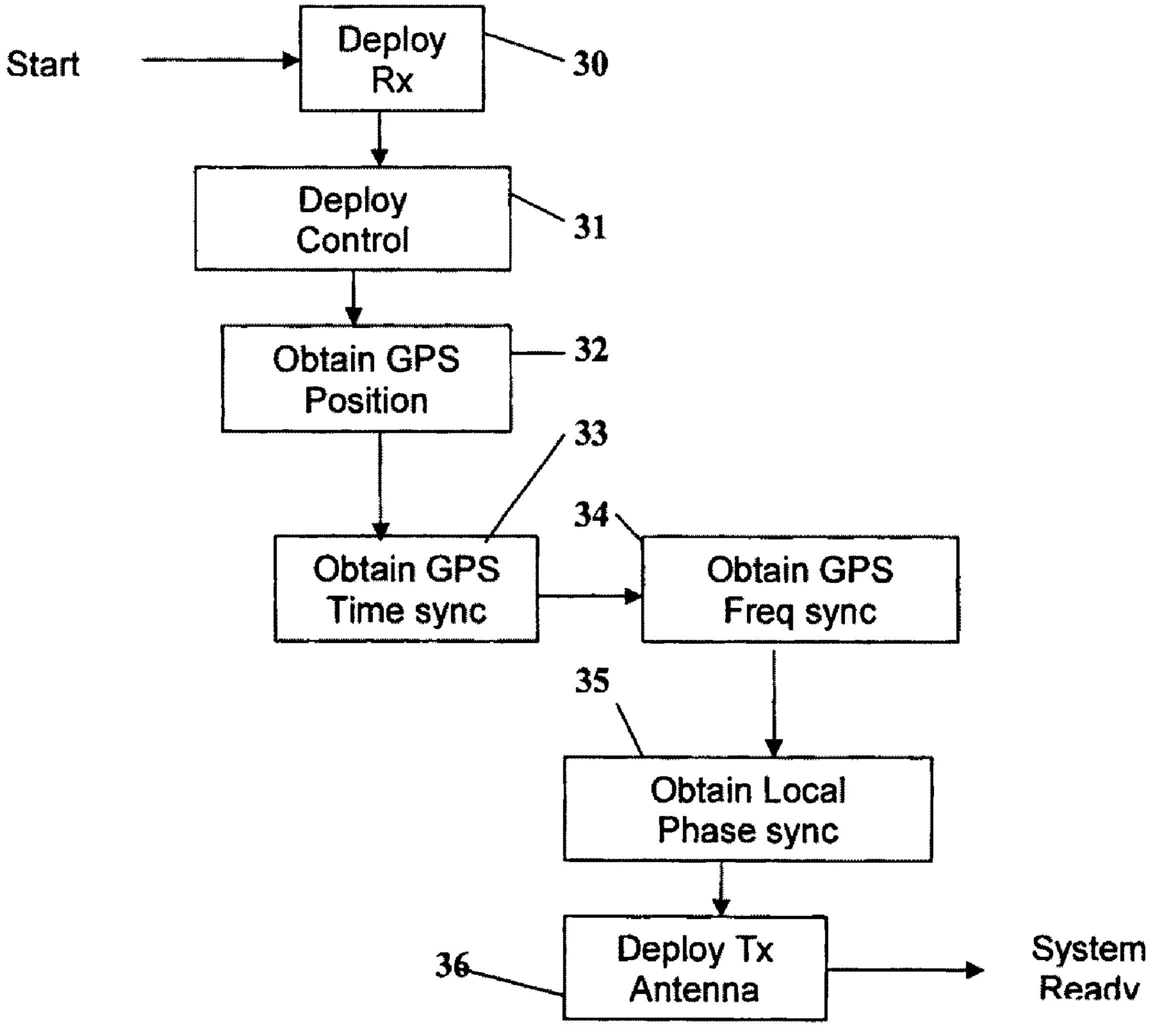
FIG. 3 is a flow chart illustrating steps in the deployment of an HF radar system according to the invention.

The sequence of operation for deployment of the antenna system is shown in FIG. 3. The antenna elements of a receiver phased array antenna are deployed as at 30 by driving a van to their intended positions, dropping off an element at each position from the van, and then driving to the next position. The elements are then connected by data link cables to the master control unit located in the van, which is parked in a desired position, and control is asserted by the master control unit as at 31. When initially deployed the antenna units and the master unit are in unknown locations, and the local oscillator and timing signals in each unit are unsynchronised. To calibrate and synchronise the array we need to obtain, Position information, Time synchronisation, Frequency synchronisation and Phase synchronisation.

The control unit first obtains the position of the master and antenna units using the satellite navigation receiver as at 32. Dependent upon the radar operating wavelength and the accuracy required, differential positioning and carrier phase methods may be used. This position information can be used to determine array alignment and beam forming coefficients.

The antenna units and master unit are then time synchronised as at 33 by using the time signals received by the satellite navigation receiver. For example the UTC coordinated 1 Pulse Per Second received by a GPS receiver can be obtained with less than 100 nano second uncertainty. This signal can be used to synchronise the generation of timing signals in each unit.

Frequency synchronisation as at 34 is required to ensure that each receiver or transmitter is tuned to exactly the same operating frequency, and that each unit does not drift relative to another. The signals received by the satellite navigation receiver are derived from high precision atomic references. In the case of GPS an accurate 1 Pulse Per Second signal is produced. This signal is compared with an equivalent signal derived from a local reference oscillator and the result is used to lock the local reference to the same frequency. Thus the local frequency reference in each antenna unit can be locked to the same satellite navigation transmission.

Phase synchronisation is required as at 35 to ensure that the receiver local oscillators in each antenna unit are locked to the same phase, so that the phased array radar will function correctly. Although the local frequency reference may be locked to the same frequency the phase may be different. To achieve phase synchronisation the master unit radiates a test signal using its low power transmitter, which is received by each antenna unit. This allows the received phase to measured at each receive element and compared, within the respective sync unit, to the expected phase determined from the known element positions. A phase correction can thus be deduced and applied.

The transmitter antenna system is then deployed as at 36. Although a single transmitter antenna element may commonly be used, in the less common case where a plurality of antenna elements are used, corresponding steps to 32-35 are carried out—except that for phase synchronisation, each antenna element will radiate a phase reference signal that is received by the master control unit.

Figure 4:
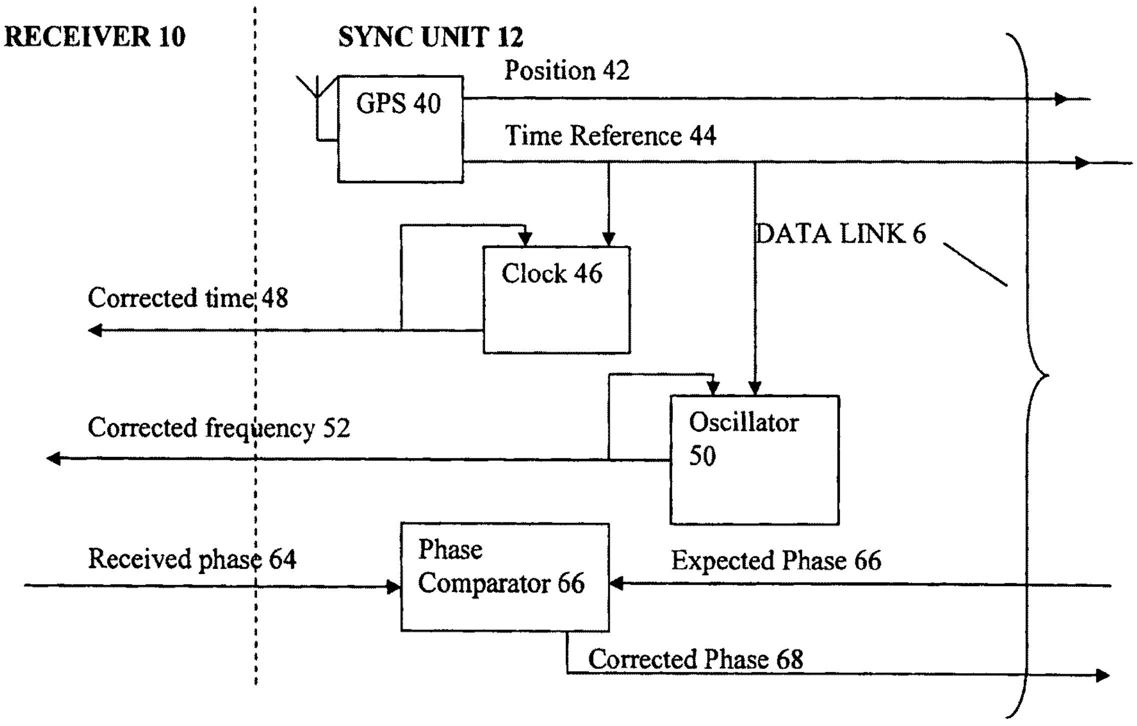
FIG. 4 is a schematic block diagram showing the sync unit of each receiver in more detail.

Referring now to FIG. 4, this shows in more detail those elements of a receiver unit 4 of an antenna element for carrying out the above procedure. Sync unit 12 comprises a GPS receiver 40 which provides position signals 42 and timing reference signals 44. These signals are fed to data link unit 6 for transmission to the master unit. In addition timing signal 44 is applied to a clock signal generating circuit 46 in order to generate a corrected time signal 48, which is applied to receiver 10.

Timing signal 44 is applied to a reference frequency oscillator 50 arranged in a locking arrangement such as a frequency locked loop or phase locked loop; the timing signal 44 is compared with an output frequency of the oscillator to provide a corrected frequency signal 52. This signal is applied to receiver 10.

In addition a means of synchronising and correcting receiver phase is provided. Transmitter 18 of master unit 14 transmits a low power transmitted signal which is detected by each antenna element. In addition, the master unit computes from the GPS position information of each receiver the expected phase of the transmitted signal in each receiver. This expected phase signal 62 is applied to each respective receiver. The actual received phase 64, after processing by the receiver, is compared with the expected phase in a phase comparator 66, and a corrected phase signal 68 is generated which is transmitted to master unit 14, and employed to ensure correct operation of the phased array radar.

The invention claimed is:

1. A method for phase-correcting a deployable HF surface wave radar phased array antenna system, the antenna system including a master control unit and a plurality of separate antenna elements which are relatively moveable to desired spaced-apart locations, wherein each antenna element includes an RF signal processing arrangement, the method comprising:

(i) determining relative positions of the antenna elements and the master control unit;

(ii) transmitting a phase reference signal; and (iii) determining, on receiving the phase reference signal and using the relative positions determined at step (i), phase correction signals for each of the plurality of antenna elements.

2. The method according to claim 1, wherein, at step (ii), the phase reference signal is transmitted by the master control unit and, at step (iii), the phase reference signal is received by each of the plurality of antenna elements.

3. The method according to claim 2, wherein the phase correction signals are applied at the master control unit.

4. The method according to claim 1, wherein step (iii) includes, for each of the plurality of antenna elements, comparing the received phase of the phase reference signal with an expected phase value determined for the antenna element using the relative positions of the master control unit and the antenna element determined at step (i) to thereby determine the phase correction signal for the antenna element.

5. A deployable HF surface wave radar phased array antenna system, comprising:

a master control unit;

a plurality of separate antenna elements which are relatively movable to desired spaced apart positions, each antenna element having respective RF signal processing arrangement; and a phase-correcting arrangement for phase-correcting the antenna system, said arrangement being operable:

(i) to determine relative positions of the master control unit and the antenna elements;

(ii) to transmit a phase reference signal; and (iii) to receive the phase reference signal and, using the relative positions from step (i), to generate respective phase correction signals for each antenna element.

6. The system according to claim 5, wherein the antenna elements are interconnected by a data link with the master control unit.

7. The system according to claim 5, wherein each antenna element includes a receiver of a satellite radio navigation system for use at step (i) in determining the location of the respective antenna element.

8. The system according to claim 5, wherein the phase correcting arrangement including at the master control unit, a transmitter, and at each of the plurality of antenna elements, a receiver, and wherein the phase correcting arrangement is arranged to transmit a phase reference signal that is detectable by each of the plurality of antenna elements, further comprising:

a comparing arrangement for comparing a phase reference signal received at each of the antenna elements with a respective expected phase value determined from relative positions of the master control unit and the antenna element.

9. A method of phase-correcting an antenna system, which is a deployable phased array transmit antenna system including a plurality of separate antenna elements which are relatively movable to desired spaced apart positions, each of the antenna elements including a respective transmitter for transmitting radio signals, and the system including a master control unit, the method comprising:

(i) positioning said antenna elements and said master control unit, and determining their locations relative to one another;

(ii) radiating, from a transmitter in said master control unit, a phase reference signal which is detected by each said receiver; and (iii) comparing the phase of the phase reference signal received by each receiver with an expected value of the phase determined from knowledge of the locations of said master control unit and said antenna elements from step (i), and generating a phase correction signal for each receiver.

10. The method according to claim 9, wherein each said phase correction signal is applied at said master control unit.

11. A method of phase-correcting an antenna system, which is a deployable phased array transmit antenna system including a plurality of separate antenna elements which are relatively movable to desired spaced apart positions, each of the antenna elements including a respective transmitter for transmitting radio signals, and the system including a master control unit, the method comprising:

(i) positioning said antenna elements and said master control unit, and determining their locations relative to one another;

(ii) radiating a phase reference signal from each said transmitter which is detected by a receiver in said master control unit; and (iii) comparing the phase of each phase reference signal received by the receiver with an expected value of the phase determined from knowledge of the locations of said master control unit and said antenna elements from step (i), and generating a phase correction signal for each said transmitter.

* * * * *

UNITED STATES PATENT AND TRADEMARK OFFICE

CERTIFICATE OF CORRECTION

PATENT NO. : 8,089,395 B2
APPLICATION NO. : 11/887895
DATED : January 3, 2012
INVENTOR(S) : Trevor Martin Blake It is certified that error appears in the above-identified patent and that said Letters Patent is hereby corrected as shown below:

On the Title Page, Item (30) Foreign Application Priority Data:

Changed "Jul. 14, 2006 (EP) ......... 06253698" to
-- Jul. 14, 2006 (EP) ......... 06253698.2 --

Signed and Sealed this
Eighteenth Day of June, 2013

Teresa Stanek Rea
*Acting Director of the United States Patent and Trademark Office*